(No Model.)
C. KESSLER.
REEL FOR SPRINKLING HOSE.
No. 578,489. Patented Mar. 9, 1897.
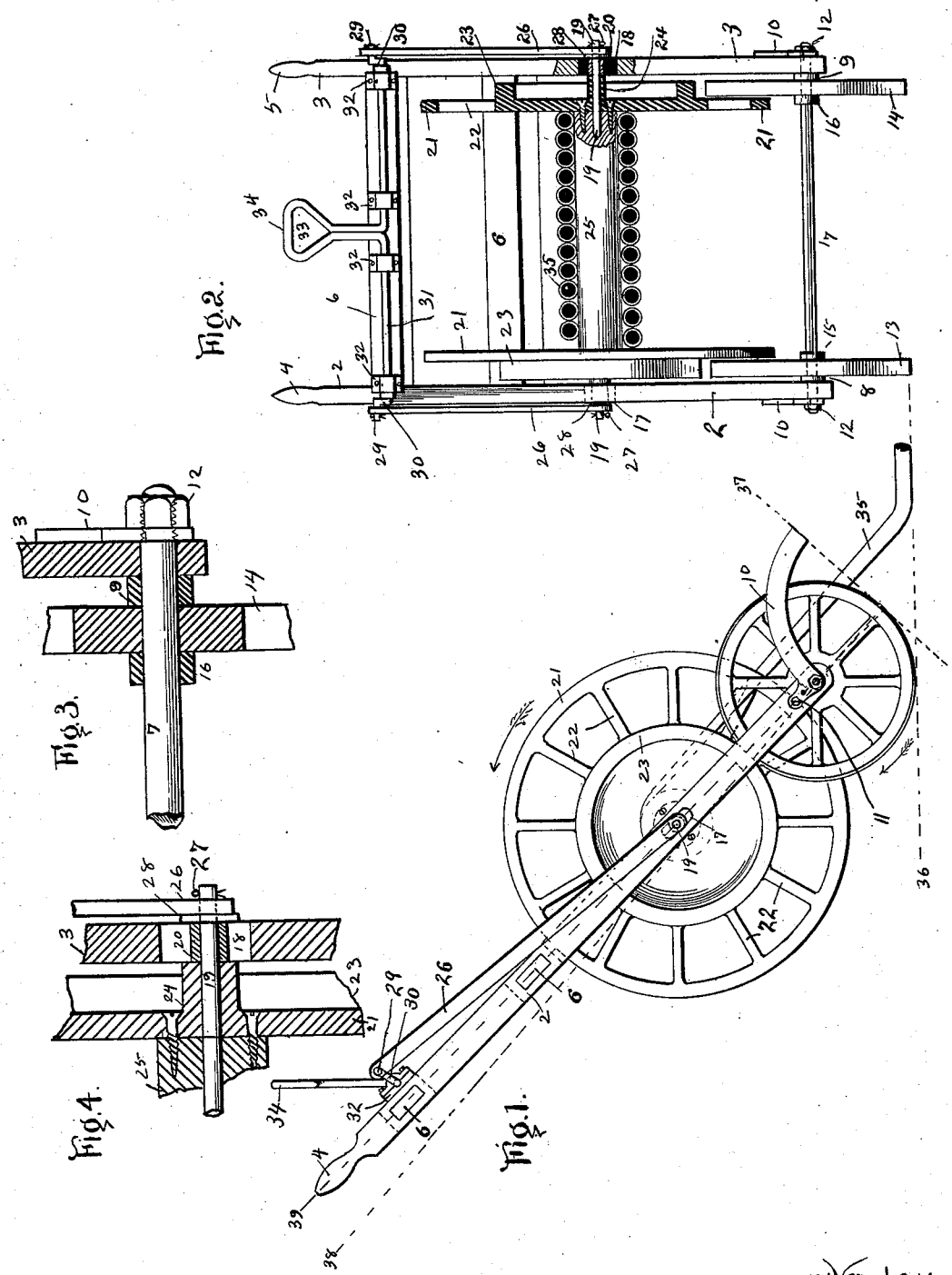
WITNESSES
L. C. Leaty
N. E. Peiffer
INVENTOR.
Charles Kessler
by Walt Kochne
his Attorney

UNITED STATES PATENT OFFICE.

CHARLES KESSLER, OF TROY, OHIO.

REEL FOR SPRINKLING-HOSE.

SPECIFICATION forming part of Letters Patent No. 578,489, dated March 9, 1897.

Application filed October 20, 1896. Serial No. 609,404. (No model.)

*To all whom it may concern:*

Be it known that I, CHARLES KESSLER, a citizen of the United States, residing at Troy, in the county of Miami and State of Ohio, have invented a new and useful Improvement in Reels for Sprinkling-Hose; and I do hereby declare that the following is a full, clear, and exact description of the invention, which will enable others skilled in the art to make and use the same, reference being had to the accompanying drawings, forming a part of this application.

In the drawings, Figure 1 is a side elevation of a reel embodying my invention, said reel being shown at about the angle for successful operation and the winding-reel being set to wind the hose as said reel is moved forward. Fig. 2 is a front elevation of the same, and Figs. 3 and 4 illustrate details of construction hereinafter more fully referred to.

2 and 3 represent parallel side frames having handle portions 4 and 5 upon their respective upper ends. Near said handle portions are one or more cross-frame pieces 6, rigidly connecting said side frames 2 and 3. Near the remaining ends of said side frames 2 and 3 is provided an opening, through which passes a rod or shaft 7, having rigid thereon collars 8 and 9, bearing against the respective inner edges of side frames 2 and 3. Upon the outer edges of each of said side frames 2 and 3 is mounted a preferably curved arm 10, having a projection 11, receiving a suitable screw or bolt or equivalent fastening for temporarily securing said arm 10 to said side frames. Said arm 10 is also provided with an opening, through which shaft 7 projects. The outer ends of shaft 7 are provided with screw-threads to receive one or more nuts 12, Figs. 2 and 3, for clamping the side frames 2 and 3 against the respective collars 8 and 9, as well as to clamp the curved arms 10 rigidly to their respective side frames. It will thus be seen that the manner of connecting the respective ends of the side frames 2 and 3 by the cross-frames 6 and the shaft 7 forms a rigid frame.

Mounted to turn freely upon the shaft 7, adjacent to the collars 8 and 9, are wheels 13 and 14, held in position by collars 15 and 16, rigid upon said shaft 7. These wheels 13 and 14 may be formed in any desirable manner of either wood or metal and may, if desirable, be provided with rubber tires to make the same noiseless.

In the respective side frames 2 and 3 and near the center of their length are formed slots 17 and 18, through which extends a shaft 19, provided with collars 20, which loosely fit the slots 17 and 18, Figs. 2 and 4. Upon this shaft 19 is mounted to turn a winding-reel, formed, preferably, of end disks 21, having a series of spokes 22 and a driving ring or wheel 23, said disk 21 being provided at its center with a hub 24, Figs. 2 and 4, in which is formed a bearing for shaft 19 to turn freely. Said hub 24 also bears against the side frames 2 and 3 to prevent end play in the winding-reel. The end disks 21 are in this instance connected by a cylindrical portion 25, which may be formed of wood or any other light and cheap material, although the portion 25 may be formed of a series of slats arranged in circular form around and at some distance from the shaft 19 without departure from the spirit of my invention.

Loosely pivoted upon the respective outer ends of shaft 19 is one end of connecting-rods 26, retained upon said shaft by split keys 27 and prevented from rubbing against the side frames 2 and 3 by washers 28, Fig. 4. The remaining ends of connecting-rods 26 are loosely pivoted to projections 29 of integral crank-arms 30, Figs. 1 and 2, said crank-arms 30 being also integral with rod or shaft 31, provided with a series of bearing-boxes 32, secured to one of the cross-frame pieces 6. The central portion of rod or shaft 31 is bent upwardly to form a loop 33, thus providing a neat handhold 34.

It will be observed that the driving wheels or flanges 23 of the winding-disk are directly opposite the supporting-wheels 13 and 14 and that by turning shaft 31, by means of the operating-handle 34, the shaft 19 is reciprocated in slots 17 and 18 in a uniformly straight line and with equal pressure throughout its length by the action of crank-arms 30 and connecting-rod 26 at each end of said shaft. This reciprocating movement of shaft 19 causes the peripheries of driving wheels or flanges 23 of said winding-reel to be brought into uniformly equal driving contact with the peripheries of supporting-wheels 13 and 14.

Consequently when said wheels 13 and 14 are revolved in the direction of the arrow in Fig. 1 by the advancing of said reel-carriage the winding-reel will be driven in the direction of the arrow in Fig. 1 to wind the hose 35 upon said reel as fast as the carriage for said reel is advanced. In advancing the carriage for the winding-reel, which carriage constitutes the frame-pieces 2 3 6, the shaft 7, and wheels 13 and 14, the most preferable means for advancing the same consists of placing one hand upon one of the handles 4 or 5 and the other upon the handhold 34. The vertically-bent portion of shaft 31 which forms this handhold is somewhat yielding or springy, and consequently in the operation of winding or driving the winding-reel the peripheries of wheels 23 are held in equally firm though somewhat yielding contact with the peripheries of wheels 13 and 14.

In Fig. 1 line 36 represents the ground-line upon which the wheels 13 and 14 move in winding, while line 37 represents the ground-line when the reel is standing, supported by the curved arms 10, and line 38 represents a perpendicular line to illustrate that the center of gravity of the reel, as shown by line 39, is between the center of wheels 13 and 14 and the support formed by the curved arms 10, thus insuring said reel of a firm standing.

When standing in this vertical position, the frame for the reel may be used as a hose or sprinkling stand by attaching to the cross-frame 6 in any well-known manner one of the ordinary hose-clasps.

Having now described my invention so full, clear, and exact that others skilled in the art may make and use the same when this exclusive grant shall cease to operate, what I claim, and desire to secure by Letters Patent, is—

1. In a reel for sprinkling-hose, the combination of a wheeled carriage, a winding-reel adjustably mounted thereon in slotted ways and having one or more disks thereon adapted to be brought into frictional driving contact with the wheels of said carriage by the adjustment of said reel, a yielding or springy operating means for manually adjusting said winding-reel, and arms 10 on and normally supporting said carriage, substantially as specified.

2. In a reel for sprinkling-hose, the combination of a wheeled carriage, a winding-reel mounted to reciprocate thereon in slotted ways, said winding-reel having one or more disks thereon adapted to be brought into frictional driving contact with the wheels of said carriage when said reel is reciprocated, connecting-rods 26 between crank-arms 30 and shaft 19 upon which said winding-reel is supported, and a yielding or springy operating-handle for the crank-arms 30, substantially as specified.

3. In a winding-reel for sprinkling-hose, the combination of a two-wheeled truck or carriage supporting a winding-reel adapted to be driven by frictional contact with said truck or carriage wheels, and curved arms 10 having integral fastening projections 11 and being secured to said truck or carriage by nuts 12 and rigid collars 8 and 9 upon an axle for said wheels, for supporting said truck or carriage in an upright position in connection with said truck-wheels, substantially as specified.

4. The combination of the side frames 2 and 3 having operating-handles 4 and 5, cross-frame 6 at one end and shaft 7 at the other, curved arms 10 on said side frames 2 and 3, said shaft passing through said side frames and curved arms 10 and clamping the same together between collars 8 and 9 and their nuts 12, and wheels 13 and 14 upon shaft 7 respectively adjacent to collars 8 and 9, said wheels being held in position by collars 15 and 16 respectively, substantially as specified.

5. The combination of a two-wheeled truck or carriage having side frames 2 and 3 and one or more cross-frame pieces 6, of a winding-reel consisting of end disks 21 having a series of spokes 22, a friction disk or flange 23 and hub 24 provided with a bearing for shaft 19 supporting said reel, said end disks being connected by a substantially circular portion 25; collars 20 on shaft 19 for engaging slots 17 and 18 respectively in side frames 2 and 3; connecting-rods 26 between the outer ends of shaft 19 and crank-arms 30 on shaft 31 having a series of bearing-boxes 32 secured to the frame-pieces, said shaft 31 being provided in its center with an integral operating-handle formed with loop 33 to provide a handhold 34; said friction disks or flanges 23 of the winding-reel being adapted to be forced into frictional driving contact with the two wheels of the truck or carriage, substantially as specified.

CHARLES KESSLER.

Witnesses:
J. W. MORRIS,
H. C. GEISINGER.